Dec. 12, 1933.  E. ANDERSON  1,938,679
SPEED INDICATING, CONTROL, SIGNAL, AND ALARM DEVICE
Filed April 21, 1927   6 Sheets-Sheet 1
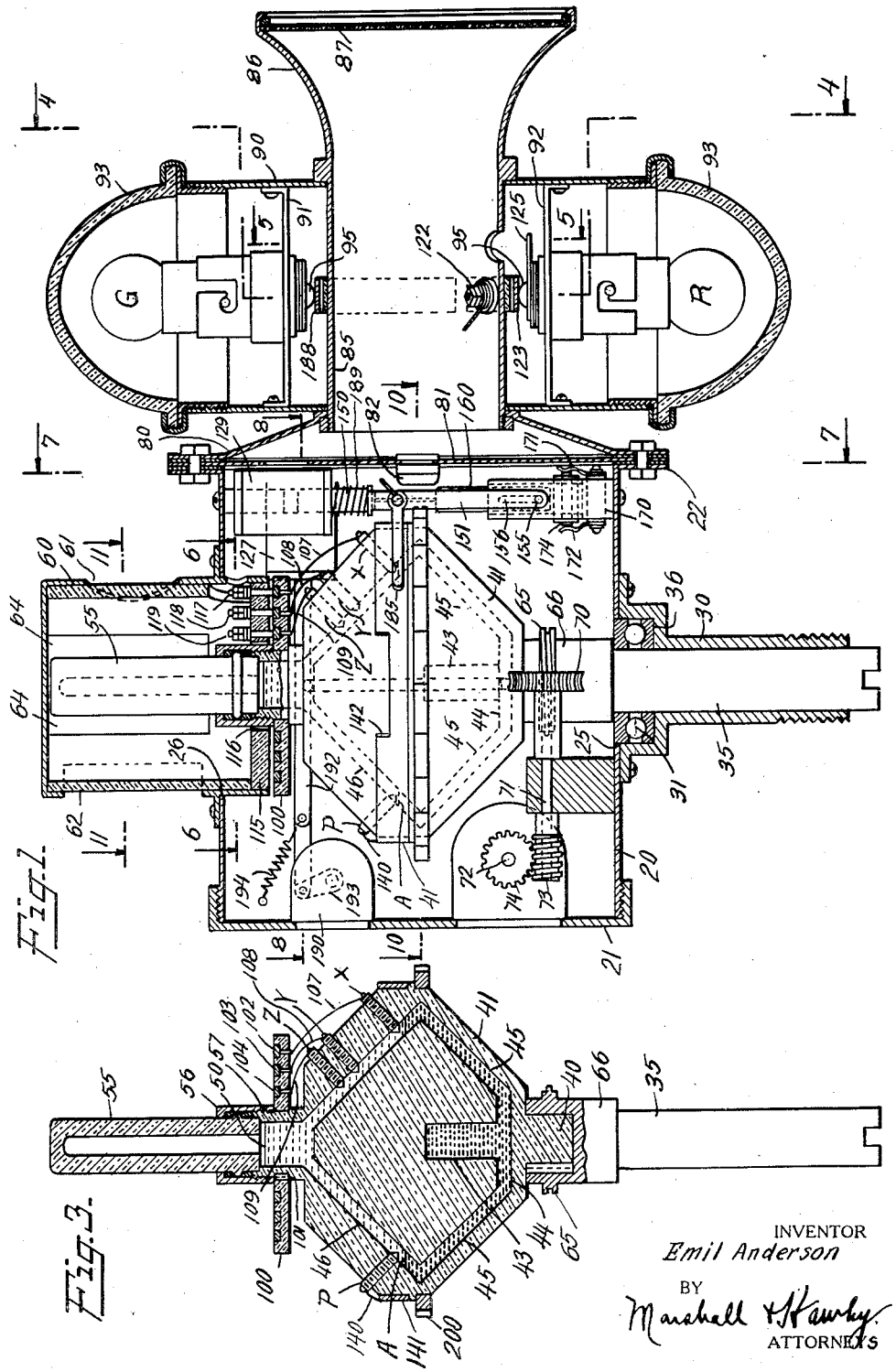
INVENTOR
*Emil Anderson*
BY
Marshall Hawley
ATTORNEYS

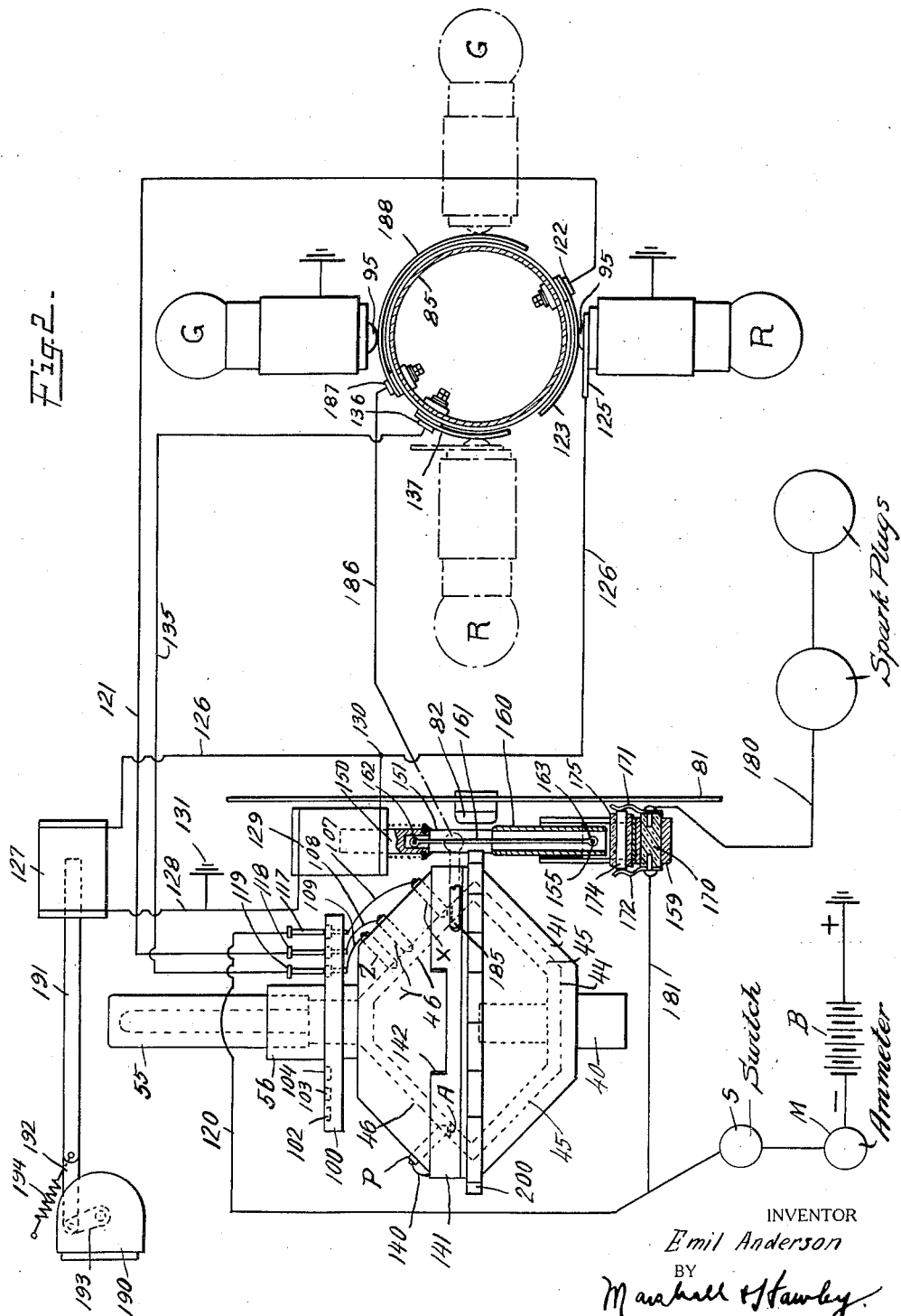

Dec. 12, 1933.   E. ANDERSON   1,938,679
SPEED INDICATING, CONTROL, SIGNAL, AND ALARM DEVICE
Filed April 21, 1927   6 Sheets-Sheet 3
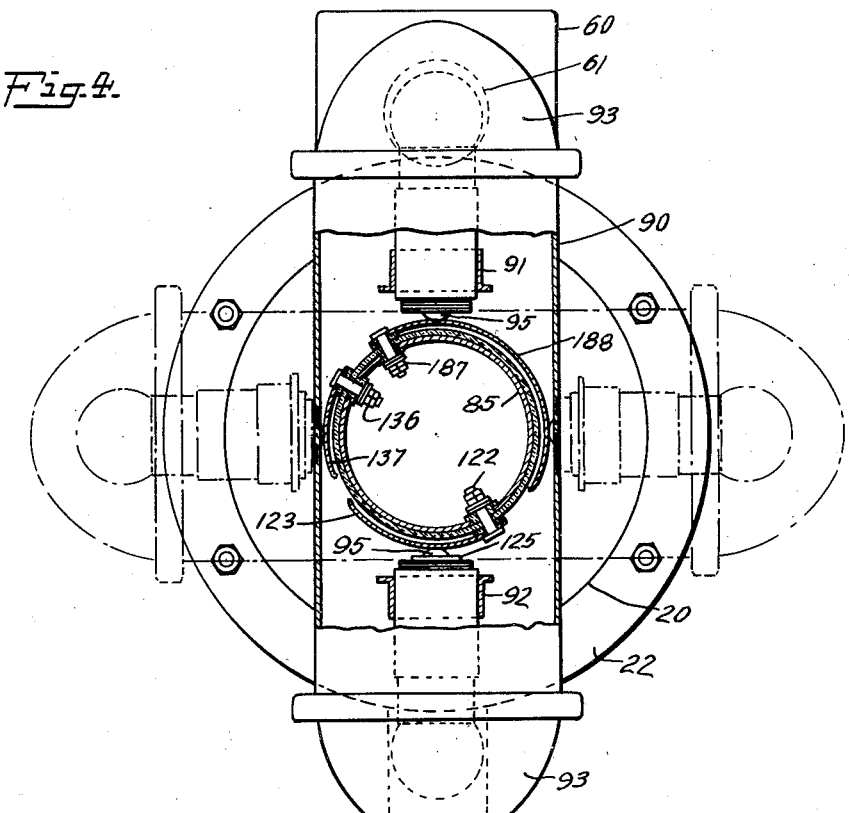
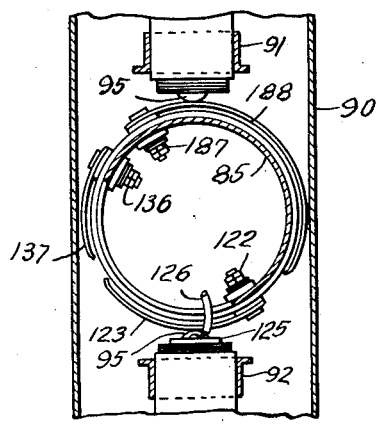
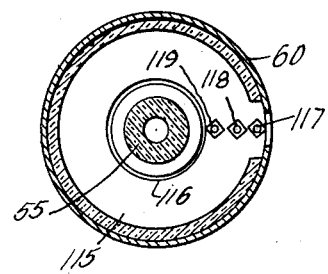
INVENTOR
*Emil Anderson*
BY
*Marshall & Hawley*
ATTORNEYS Dec. 12, 1933.   E. ANDERSON   1,938,679
SPEED INDICATING, CONTROL, SIGNAL, AND ALARM DEVICE
Filed April 21, 1927   6 Sheets-Sheet 4
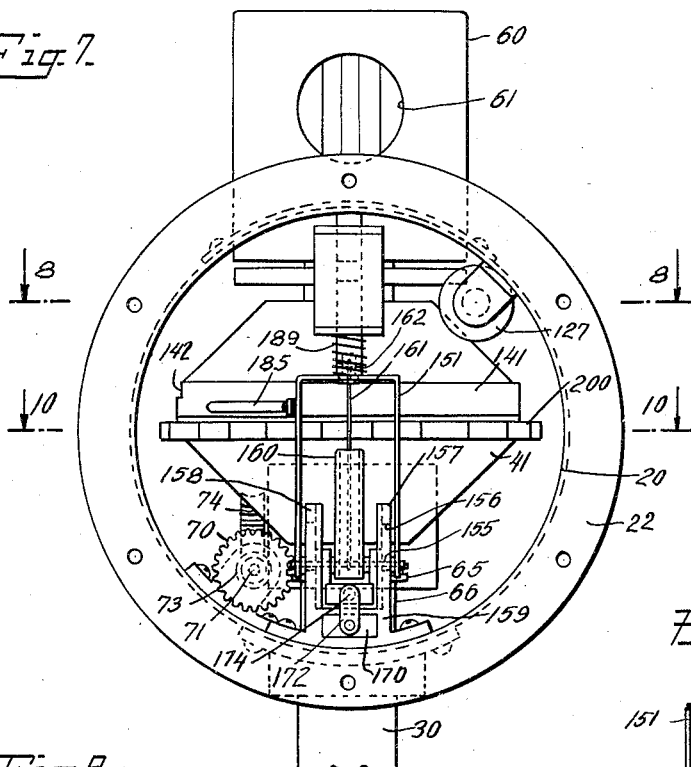
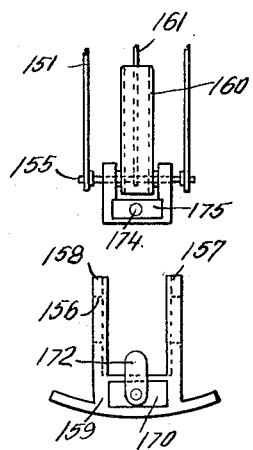
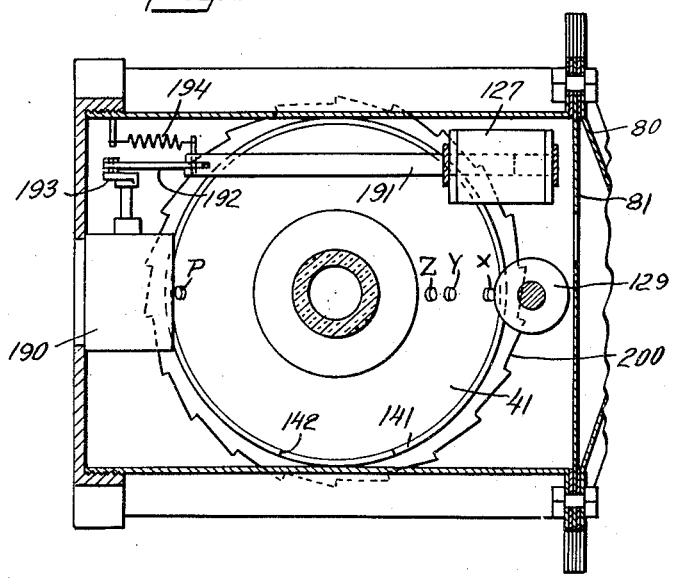
INVENTOR
*Emil Anderson*
BY
*Marshall & Hawley*
ATTORNEYS Dec. 12, 1933.  E. ANDERSON  1,938,679
SPEED INDICATING, CONTROL, SIGNAL, AND ALARM DEVICE
Filed April 21, 1927  6 Sheets-Sheet 5
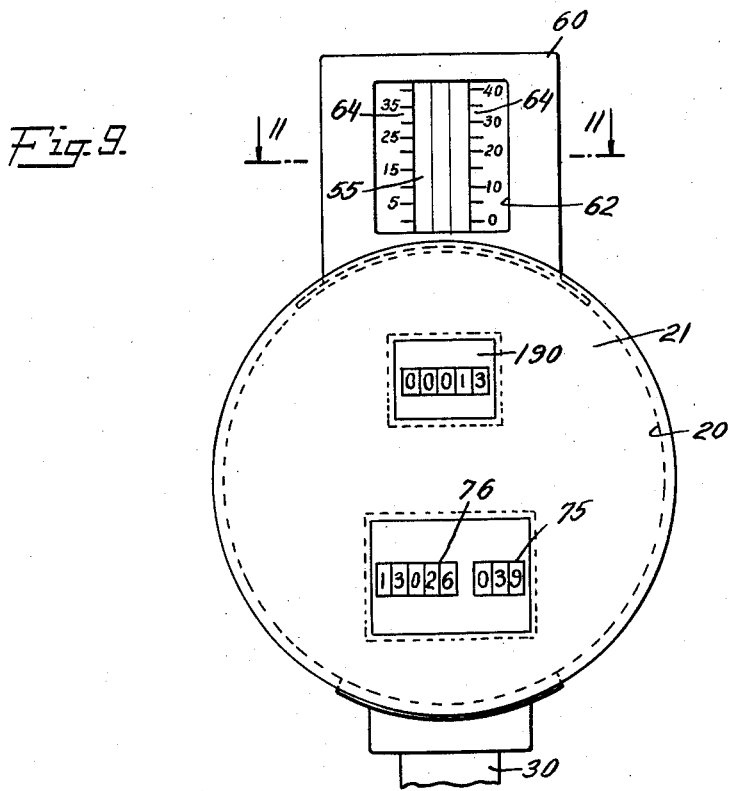
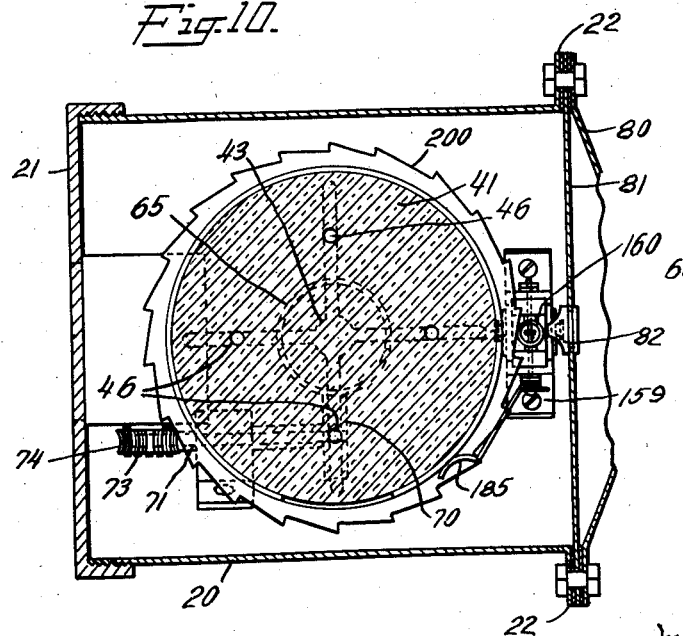
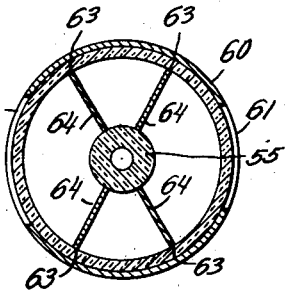
INVENTOR
Emil Anderson
BY
Marshall & Fawley
ATTORNEYS

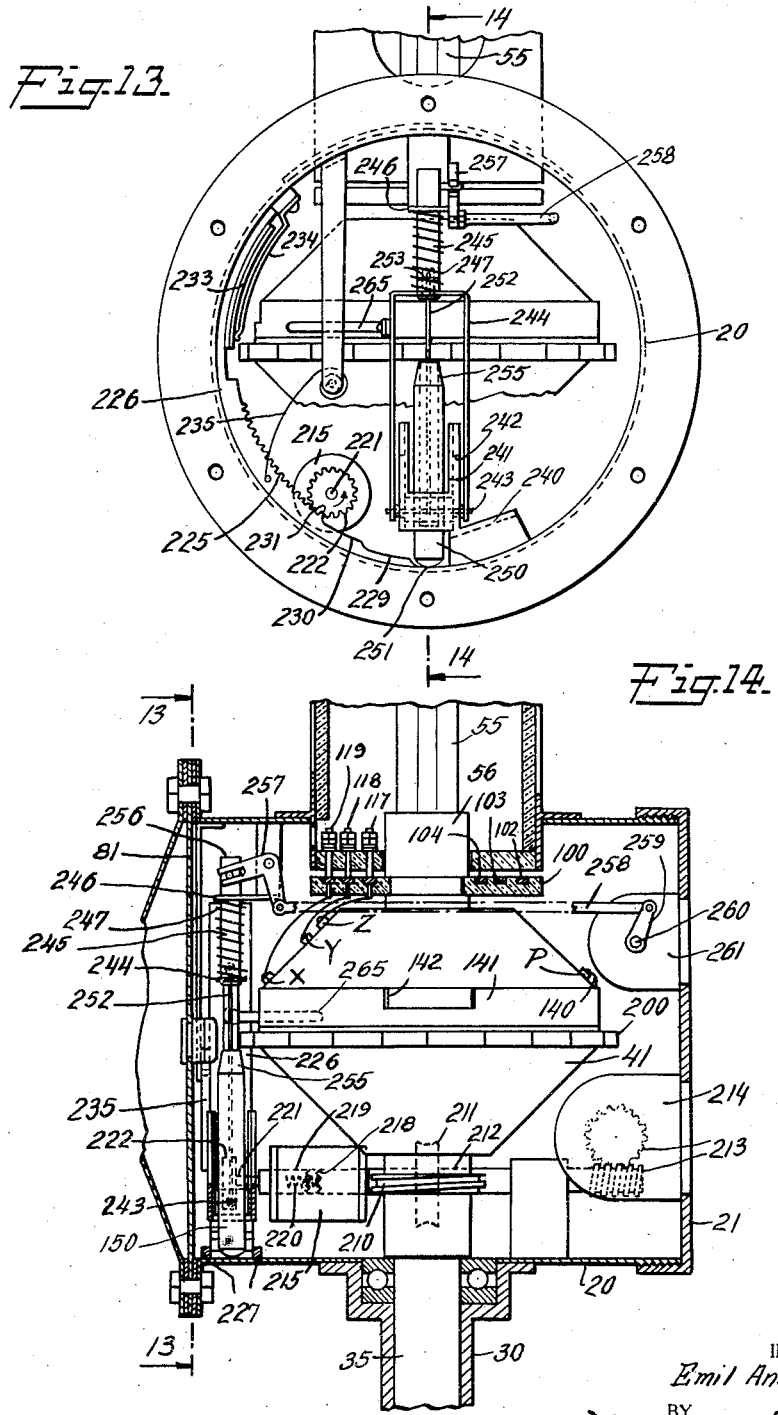

Patented Dec. 12, 1933

1,938,679

UNITED STATES PATENT OFFICE 1,938,679

SPEED INDICATING, CONTROL, SIGNAL, AND ALARM DEVICE

Emil Anderson, Briarcliff Manor, N. Y., assignor of three-fourths to Olson Brothers Saw Manufacturing Company, a corporation of New York Application April 21, 1927. Serial No. 185,407

6 Claims. (Cl. 177—311.5)

This invention relates to a combined signal, alarm, control and recording device for preventing speeding of motor vehicles.

As is well known, the driving of motor vehicles at high speeds shortens the life of the motor and vehicle, causes accidents and endangers life. This is particularly true of vehicles such as trucks as it is very difficult to obtain careful truck drivers and to check up drivers to determine whether they are driving carefully and obeying speed regulations.

This invention has for its salient object to provide a device that will visibly indicate when the vehicle is speeding and will record speed violations.

Another object of the invention is to provide a device so constructed that an alarm will be given when the vehicle is being driven at a faster rate of speed than that allowed by speed regulations.

Another object of the invention is to provide a device of the character described so constructed and arranged that the maximum speed limit can be varied to suit city or suburban driving.

Another object of the invention is to provide a simple and practical governor and means controlled by the governor for limiting the maximum speed at which the vehicle can be operated.

Another object of the invention is to provide a simple and practical combined governor and alarm device for indicating speed violations.

Another object of the invention is to provide a simple, practical and accurate speed indicating device.

Further objects of the invention will appear from the following specification taken in connection with the drawings, which form a part of this application, and in which Fig. 1 is a sectional elevation illustrating a device constructed in accordance with the invention;

Fig. 2 is a view partly diagrammatic illustrating the wiring connections for the various parts of the device;

Fig. 3 is a sectional elevation showing the governor construction and associated parts;

Fig. 4 is a sectional elevation taken substantially on line 4—4 of Fig. 1;

Fig. 5 is a detail sectional elevation taken substantially on line 5—5 of Fig. 1;

Fig. 6 is a transverse sectional elevation taken substantially on line 6—6 of Fig. 1;

Fig. 7 is an elevational view taken substantially on line 7—7 of Fig. 1;

Fig. 8 is a sectional elevation taken substantially on line 8—8 of Fig. 7;

Fig. 9 is a front elevation showing the speed indicating device, mileage recorder and speed violation recording device;

Fig. 10 is a sectional elevation taken substantially on line 10—10 of Fig. 7;

Fig. 11 is a sectional elevation taken substantially on line 11—11 of Fig. 1;

Fig. 12 is an elevational view showing the alarm control plunger and associated parts;

Fig. 13 is a sectional elevation illustrating a modified form of the invention taken substantially on line 13—13 of Fig. 14; and Fig. 14 is a sectional elevation of the form of the device shown in Fig. 13 and taken substantially on line 14—14 of Fig. 13.

The invention briefly described consists of a device so constructed and arranged that when a vehicle is started, a signal device, such as a green lamp, is lighted. This lamp remains lighted as long as the vehicle is running and indicates whether the device is in proper working condition. After the vehicle reaches a certain predetermined speed another signal device is operated, such as a red lamp, and at the same time, an alarm is sounded. Also, when the vehicle exceeds a predetermined maximum speed, a registering device is operated whereby a counter moves forward one digit, thus recording the speed violation. Furthermore, when the predetermined maximum speed is exceeded, the spark circuit for the motor is interrupted and the vehicle must be slowed down before the ignition circuit will again operate.

The governor device also operates a speed indicating mechanism so calibrated that the speed of operation can be read thereon. The governor is also geared to a mileage recording device which operates in the usual manner.

The signal and alarm devices are so constructed and arranged that they can be set to operate at two or more predetermined maximum speeds. For instance, in country or suburban driving, a higher maximum is permitted than in city driving.

Various novel features are incorporated in the speed governor, speed indicating, signalling, alarm and speed registering devices and these will be brought out in more detail in the following description.

In order to make clear the construction and operation of the various parts of the machine, these parts will be described under several different headings.

Speed control governor and indicating mechanism

In the form of the invention illustrated in Figs. 1 to 12 inclusive, the governor and indicating mechanism is mounted in a substantially cylindrical casing 20 having a cap 21 at one end thereof and a laterally extending flange 22 at the opposite end thereof.

The casing 20 also has diametrically opposed openings 25 and 26 therein. A bearing sleeve 30 is secured to the bottom of the casing 20 and surrounds the opening 25 and a thrust bearing 31 is mounted in a bearing seat 36 formed in the sleeve 30.

A shaft 35 is rotatably mounted in sleeve 30 and has mounted on its upper end a cylindrical stud 40 formed on the governor 41. The shaft 35 may be connected at its lower end to the usual flexible speedometer shaft and may be driven from the vehicle wheel or from the transmission shaft, as desired.

The governor 41 is preferably formed of suitable insulating material, such as hard rubber, bakelite or some similar substance. There is formed in the governor, a central upwardly extending chamber 43 disposed in alinement with the axis of rotation of the governor and a plurality of conduits 44 which extend radially from the central chamber 43 and as illustrated in Fig. 3, have outwardly and upwardly extending portions 45 and inwardly and upwardly extending portions 46. The portions 46 of the conduits communicate with a central chamber 50 disposed above and in alinement with the axis of the governor and also in alinement with the central chamber 43.

The central chamber 43 and the conduits 44 contain two liquids of different density, such as mercury and kerosene oil, the lighter liquid, such as kerosene oil, floating on the heavier liquid, such as mercury. There is sufficient mercury in the central chamber 43 and conduits 44 to reach a predetermined level, such as indicated at A in Fig. 3 and the kerosene extends upwardly into the chamber 50.

A tube 55 of glass or other suitable transparent material is secured by a cap 56 to the upwardly extending portion 57 of the governor which forms the chamber 50.

A casing 60 is secured to the upper surface of the casing 20 around the opening 26 and is provided with windows 61 and 62 through which the tube 50 can be observed. Wings or vanes 63 are carried by the top of the casing 60 and are disposed radially with respect to the tube 55. These vanes assist in directing the light to the tube. Calibrated scales are formed on the surfaces 64 of the vanes 63 and are suitably calibrated to indicate the speed at which the vehicle is being driven. The scales can be read through both windows 61 and 62.

It will be obvious that as the governor 41 is rotated, the mercury will rise in the conduits 44, being forced outwardly from the central chamber 43 by centrifugal force. As the mercury rises, it will force the lighter liquid, such as kerosene, up into the tube 55, thus accurately indicating the speed at which the vehicle is being propelled. The kerosene or other liquid is suitably colored to be readily visible.

A worm 65 is mounted on a coupling 66 which connects the shaft 35 to the stud 40 and the worm is geared to a worm gear 70 carried by shaft 71 which is connected to drive a mileage indicator shaft 72 through gearing 73, 74. Suitable counting mechanism is driven by the shaft 72 and registers in the usual well known manner the trip mileage and total mileage, as shown at 75 and 76 in Fig. 9.

Signal light and alarm control mechanism

Means is provided for sounding an alarm when a predetermined maximum speed has been exceeded and also for lighting a signal lamp when the vehicle starts in motion and for lighting a further lamp after a predetermined maximum speed has been exceeded. Furthermore, the device is so constructed and arranged that the first signal light illuminated will emit a steady glow until the predetermined maximum speed has been exceeded whereupon this lamp will be lighted intermittently and will flicker. At the same time, the second lamp preferably of different color, such as red, will be illuminated.

As shown in Fig. 1, a disk 80 is secured to the flange 22 on the casing 20 and intermediate the disk and the flange there is secured a diaphragm 81 of the horn or alarm device. A button 82 is mounted at the center of the diaphragm 81.

The disk 80 has a central opening therein in which is mounted a cylindrical sleeve 85 having its outer end flared as shown at 86 and provided with a screen 87. The sleeve, therefore, forms the horn for the alarm device.

A cylindrical casing 90 is rotatably mounted on the sleeve 85, the sleeve extending through a central opening in the casing 90.

In the form of the invention illustrated, two signal lamps G and R are mounted on supports 91 and 92 disposed in the casing 90. A glass dome or cover 93 is secured over the outer end of each end of the casing and surrounds the lamp.

Each lamp has a center contact 95, the other lamp contact being grounded.

Signal lamp and alarm circuits

As shown in Fig. 3, one of the conduits 44 in the governor 41 has extending thereinto a plurality of threaded contact plugs X, Y and Z arranged as shown at different elevations in the conduit. A fourth plug P also extends into the conduit 44 but is diametrically opposite the contact plug X and at substantially the same elevation.

A disk 100 formed of suitable insulating material is secured between the cap 56 and a shoulder 101 formed on the governor. The disk has mounted therein three concentric metallic rings 102, 103 and 104, these rings being connected respectively to the contact plugs X, Y and Z by wires 107, 108 and 109. A disk 115 formed of insulating material is secured in the casing 60 and has a central aperture 116 which receives the cap 56. The disk 115 as shown in Fig. 1 has contact pins 117, 118 and 119 secured thereto and disposed in vertical alinement with the rings 102, 103 and 104, the pins having a wiping contact with the rings. Pin 117 is connected by a wire 120 through an ignition switch S and an ammeter M to one side of a battery B, the other side of the battery being grounded.

The contact pin 118 is connected by a wire 121 to a contact terminal 122 carried by but insulated from the sleeve or casing 85. An arcuate metallic contact strip 123 is secured to and contacts with the contact terminal 122. This strip as shown in Fig. 2 engages the center contact terminal 95 of the red lamp R. The center contact 95 of the lamp R also has extending laterally therefrom, a strip 125 which is connected by a wire 126 to a solenoid 127. The wire 126 is wound around the solenoid and is extended as shown at 128 and extends around a second solenoid 129 and is connected at 130 to the wire 126. The extension 128 is also grounded as shown at 131.

The third contact pin 119 is connected by a wire 135 to a contact terminal 136 also secured to the sleeve 85 and insulated therefrom. The terminal 136 has an arcuate strip 137 secured thereto and in electrical contact therewith.

The contact plug P is connected by a wire 140 to a metallic ring 141 secured to the outer surface of the governor 41. The ring 141 is continuous along its lower edge but the upper portion is cut away or interrupted as shown at 142 for a purpose hereinafter set forth.

The solenoid 129 controls a core or plunger 150 carried by a yoke 151. The lower end of the yoke carries a cross pin 155 which extends through slots 156 formed in a pair of legs 157 and 158 of a supporting and guiding frame 159. The pin 155 also has pivotally mounted thereon a tube 160, the pivotal movement of the tube being limited by a wire 161 secured at its upper end to the plunger 150 as shown at 162 and at its lower end encircling the pin as shown at 163. The frame 159 has an insulating plug 170 secured therein. Spring contact strips 171 and 172 are carried by the plug 170 and extend upwardly in position to engage the ends of a metallic pin 174 which extends through an insulating bushing or plug 175 carried by the yoke 151.

The contact strip 171 is connected by a wire 180 to the spark plugs of the engine and the strip 172 is connected by a wire 181 to the wire 120.

A wiper strip 185 is carried by the yoke 151 and projects laterally therefrom in position to engage the ring 141. The wiper 185 is connected by a wire 186 to a contact terminal 187 carried by the sleeve 85 but insulated therefrom. The terminal 187 has secured thereto and in electrical contact therewith, an elongated arcuate strip 188 adapted to engage the central contact terminal 95 of the lamp G. A spring 189 encircles the plunger or core 150 and is disposed between the yoke 151 and the solenoid 129 for the purpose of returning the plunger to its lower position after its actuation by the solenoid.

A violation counter device 190 is actuated by a plunger 191 which forms the core of the solenoid 127 and is connected by a link 192 to an arm 193 which in turn is connected to the operating shaft of the counter mechanism. A spring 194 returns the plunger and arm 193 to initial position after the actuation of the violation counter and after the solenoid 127 has been de-energized.

*Operation of signal lamps, alarm device and violation counter*

As soon as the vehicle is started in operation, the mercury in the lower portions 45 of the conduits 44 will engage the plugs X and P and complete the circuits through the ignition mechanism and through the green lamp G in the following manner.

From the negative side of the battery, the circuit passes through wire 120 to pin 117, ring 102, plug X, mercury, plug P, wire 140, ring 141, wiper 185, wire 186, terminal 187, strip 188 and lamp terminal 95 to the ground and thence back to the other side of the battery B. Thus, the green lamp will operate steadily as the vehicle is started. When the governor is rotated at a sufficient speed to cause the mercury to contact with the terminal or plug Y, the circuit to the red lamp R is completed through wire 108, ring 103, pin 118, wire 121, contact 122, strip 123 and lamp contact 95 to the red lamp R and thence to the ground and back to the other side of the battery B. At the same time, the circuit will pass from the lamp contact 95 through strip 125 and wire 126 to solenoids 127 and 129 in parallel through wire 128 to ground 131. Both of the solenoids 127 and 129 will thus be energized. The energizing of the solenoid 127 will cause the plunger 191 to be drawn into the solenoid, thus actuating the counter arm 193 and registering a speed violation on the violation counter 190.

The energizing of the solenoid 129 will cause the plunger 150 to be drawn into the solenoid, thus moving the wiper 185 upwardly into alinement with the interrupted portion of the ring 141. This will cause the green lamp G to flicker.

The energizing of the solenoid 129 also raises the tube 160 into a position between a plurality of peripheral lugs 200 secured to the outer periphery of the governor and the button 82 carried by the central portion of the alarm diaphragm 81. The rotation of the lugs 200 will cause the tube 160 to oscillate and the tube in turn will cause the button 82 and diaphragm 81 to vibrate rapidly, sounding an alarm.

As above stated, the casing 90 is rotatably mounted on the sleeve 85 for the purpose of providing for different maximum speed limits. One position of the lamps G and R is shown in full lines in Fig. 2 and another position is shown in dotted lines. In the dotted line position it will be noted that the lamp G still contacts with the strip 188. The central contact 95 of the lamp R, however, engages the strip 137 which is controlled by wire 135, pin 119, wire 109 and contact plug Z. Thus when the lamps are rotated to the position shown in dotted lines, the red lamp will not be lighted until the governor is rotated at sufficient speed to cause the mercury to rise into contact with the plug Z. The red lamp will then be lighted, the alarm will be sounded and the counter will be actuated.

At the same time the raising of the plunger 150 will remove the pin 174 from between the contacts 171 and 172 and the ignition circuit to the spark plugs will be interrupted, thus cutting off the ignition and requiring the driver to slow down before the ignition circuit can be again closed by the pin 174. In other words, until the driver slows down sufficiently to cause the mercury in the governor to be positioned below the stud Y or Z as the case may be, the alarm will continue to sound, the green light will flicker and the red light will be illuminated.

*Description of structure shown in Figs. 13 and 14*

Another form of construction is illustrated in Figs. 13 and 14, this form being particularly designed to produce progressive warning signals for the purpose of warning the driver that he is exceeding the speed limit before registering a speed violation and interrupting the spark. In this form of the invention, the governor 41 is carried by the shaft 35 and is disposed in the casing 20 as in the other form of the invention. The upper end of the shaft 35 has a worm 210 mounted thereon which meshes with a worm gear 211 carried by a shaft 212. One end of the shaft 212 is connected by gearing 213 to the mileage register 214. The shaft 212 also has mounted thereon a clutch member 218 which is adapted to coact with a clutch member 219 normally held out of engagement with the clutch member 218 by a spring 220. The clutch member 219 forms the core of a solenoid 215 which is connected in the lamp circuit of the red lamp hereinbefore described.

The clutch member 219 is connected to a spindle 221 on which is mounted a pinion 222. Pinion 222 meshes with an arcuate rack 225 formed on a ring or arcuate strip 226 rotatably mounted between collars 227 carried by the inner wall of the casing 20.

The ring 226 has an extension in the form of ledges or cams 229, 230 and 231, the cam 231 being formed by the teeth of rack 225. The ring 226 also has a metallic conducting strip 233 secured thereto and adapted to coact with a wiper blade 234 carried by the casing 20 to form a switch which is incorporated in the ignition circuit.

A spring 235 is secured to the ring 226 for returning the ring to its initial position after it has been actuated in the manner hereinafter described.

A bracket 240 is affixed to the inside of the casing 20 and has mounted thereon a U-shaped support 241 provided with slots 242 through which extends a pin 243 carried by the lower end of a yoke 244. The yoke in turn is carried by a plunger 245 slidably mounted in a bracket 246 also mounted on the inside of the casing 20. A spring 247 is interposed between the top of the yoke 244 and the bracket 246 and normally depresses the yoke.

A plunger 250 is also mounted on the pin 243 and extends loosely through the bracket 240, the lower end being normally disposed in engagement with the inner surface of the casing 20 as shown at 251 in Fig. 13. A wire 252 extends through the portion of the plunger above the pin 243 and is connected at its lower end to the pin and at its upper end to a pin 253 carried by the plunger 245. This wire limits the oscillating movement of the plunger about the pin 243 as its pivot.

The upper end of the plunger 250 is tapered as shown at 255 for a purpose hereinafter set forth.

The plunger 245 is extended above the bracket 246 as shown at 256 and is connected by a bell crank lever 257 to a link 258 which in turn is connected at its opposite end to an arm 259 connected to the shaft 260 of the violation recorder 261.

As in the preceding embodiment of the invention, the diaphragm 81 is carried at one end of the casing 20 and is provided with the centrally disposed button 82.

The governor 41 also has mounted on its periphery a ring having teeth or lugs 200 as in the other embodiment of the invention and the governor also carries a metallic conducting ring 141 having an interrupted portion 142.

Plugs X, Y, Z and P are also carried by the governor and are mounted in the same manner as in the other form of the invention and plug P is connected by wire 140 to the ring 141. Plugs X, Y and Z are connected in a manner already described to the rings 102, 103 and 104 carried by the insulating disk 100 and the pins 117, 118 and 119 are connected in a manner already described to the lamp circuits and other control circuits.

A wiper blade 265 is carried by the yoke 244 and contacts with the ring 141.

*Operation of structure shown in Figs. 13 and 14*

When the vehicle is started, the mercury will contact with the plugs X and P and the green lamp will be lighted as in the other form of the invention. When the operator drives the vehicle at a sufficient speed to cause the mercury to contact with the plug Y, the red lamp R will be illuminated and the solenoid 215 will be energized, thus connecting the clutch 218, 219 and driving the gear 222. It will be understood that the speed reduction between the governor and gear 222 is very great, such, for instance as twenty to one. Therefore, the gear 222 will rotate very slowly. As this gear is rotated, the arcuate strip or ring 226 will be moved by reason of the engagement of the gear 222 with the rack 225. This will cause the cam surface 229 to raise the plunger 250. As the plunger is raised, the yoke 244 will also be raised and with it, the wiper blade 265 which will then engage the interrupted portion of the ring 141, causing the green lamp to flicker.

If the operator does not then reduce his speed within a predetermined distance of travel,—say, for instance, twenty feet, the plunger 250 will be again raised by the cam surface 230. This will cause the upper part of the tapered portion 255 of the plunger to be positioned between the lugs 200 and button 82 and the alarm will be sounded, the green lamp will still flicker and the red lamp will continue to burn.

If the operator does not then reduce his speed within a predetermined distance, the continued rotation of the gear 222 will cause the plunger to be again lifted to the cam surface 231 formed by the teeth of rack 225 whereupon the horn will sound louder, the violation recorder will be operated and the switch wiper blade 234 will be moved out of contact with the strip 233, thus cutting off the ignition circuit. As soon as the ignition circuit is cut off, the vehicle will then slow down until the mercury in the governor moves out of contact with the plug Y or Z as the case may be whereupon the ignition circuit will again be closed, the red lamp will go out, the alarm will cease to sound and the green lamp will burn with a steady glow.

It will be obvious from the preceding specification that a simple and practical device has been designed having for its general purpose the elimination of speeding. By means of this device, the operators of vehicles can be checked up on speed violations and the traffic officers can tell by ear and by sight when a vehicle is exceeding the prescribed maximum speed limits. Furthermore, it will be clear that a simple and practical form of governor and speed indicating device has been designed and that the speed indicator will accurately indicate the speed of operation of the vehicle.

Although certain specific embodiments of the invention have been particularly shown, and described, it will be understood that the invention is capable of modification and that changes in the construction and in the arrangement of the various cooperating parts may be made without departing from the spirit or scope of the invention, as expressed in the following claims.

What I claim is:

1. In combination, a rotary speed controlled governor comprising a governor casing rotatable in a fixed path and having offset portions on its outer surface rotatable in a fixed path, a vibratory alarm device, and means controlled by the speed of rotation of the governor for causing said offet portions to vibrate said alarm device.

2. In combination, a rotary speed controlled governor comprising a governor casing having offset portions on its outer surface rotatable in a fixed path, a vibratory alarm device, and means controlled by the speed of rotation of the governor and movable between the offset portions and alarm device for causing said offset portions to vibrate said alarm device.

3. In combination, a governor, an alarm device including a diaphragm, means including a rotatable ring connected to the governor and having lugs, and means intermediate the ring and diaphragm for causing the lugs to vibrate the diaphragm, means controlled by the governor for moving said intermediate means to operative position, a signal device, an electric circuit therefor, a contact member in said circuit carried by said intermediate means, and a contact ring on the governor normally engaged by said contact member, said ring having an interrupted portion engageable by said contact member when said intermediate means is moved to operative position between the lugs and diaphragm.

4. In combination, a normally open electric circuit, a rotary speed controlled governor comprising a governor casing having offset portions on its outer surface and having means for closing the electric circuit at a predetermined speed of said governor, a vibratory alarm device, means normally inoperative but movable into operative position to cause said alarm device to be operated by said offset portions and means controlled by the speed of rotation of the governor and the closing of the electric circuit for moving said second means to operative position and causing said offset portions to operate said alarm device.

5. In combination, an alarm device, a speed indicator, said alarm device including a diaphragm, a governor having lugs rotatable with the governor and at a fixed distance from the axis of rotation thereof, means movable between the lugs and diaphragm to cause the lugs to vibrate the diaphragm, a normally open electric circuit, means operative by the governor at a predetermined speed for closing said circuit, and means controlled by the closing of said circuit for moving said movable means between the lugs and diaphragm.

6. In combination, a normally open electric circuit, a rotary speed responsive device including a casing rotatable in a fixed path and having circuit closing means for closing said circuit at a predetermined speed of said device, a plurality of offset portions on said casing, a diaphragm, means normally in inoperative position but movable into operative position to cause vibration of the diaphragm by said offset portions, means operated by closure of said electric circuit by said circuit closing means for moving said second named means to operative position.

EMIL ANDERSON.